United States Patent Office 2,849,428
Patented Aug. 26, 1958

2,849,428

PROCESS FOR THE PREPARATION OF A DISSOLVED ALUMINUM CHLORIDE CATALYST

Augustus B. Small and John L. Ernst, Baton Rouge, La., assignors to Esso Research and Engineering Company, a corporation of Delaware No Drawing. Application June 24, 1953
Serial No. 363,931

8 Claims. (Cl. 260—85.3)

The present invention relates to the preparation of catalyst and more particularly relates to the preparation of dissolved aluminum chloride catalysts useful for hydrocarbon reactions.

The use of aluminum chloride dissolved in alkyl halides or other solvents as a catalyst for hydrocarbon reactions is well known. Such reactions include isomerization, alkylation, polymerization, copolymerization and the like. One of the more common reactions in which a dissolved aluminum chloride is used as catalyst is the copolymerization of a major proportion of isobutylene with a minor amount of a diolefin such as isoprene or butadiene at a temperature below −50° C. The catalyst solution used in these processes is generally prepared by agitating aluminum chloride with sufficient alkyl halide or other solvent to give the desired catalyst concentration. While this technique in preparing the catalyst has been successful it has been found that the weight of polymer obtained per weight of catalyst is somewhat lower than desired, being in the order of about 500 to 2000. Attempts have been made to overcome the above difficulties by passing the alkyl halide through a body of aluminum chloride at room temperature, but the results have not been successful.

It has now been found that the catalyst efficiency may be greatly increased by the use of an improved technique for preparing the aluminum chloride solution.

According to the invention the alkyl halide or other solvent is cooled to a temperature in the neighborhood of −80° C. and passed through a body of solid aluminum chloride also maintained at a temperature of about −80° C. The aluminum chloride may be powdered or in lump form. The lumps may be as large as 4 mesh or smaller. The liquid alkyl halide or other solvent picks up a small but constant amount of the aluminum chloride. When the resulting solution of aluminum chloride is used to catalyze efficiency is found to be greatly increased.

Suitable solvents for the aluminum chloride include methyl chloride, ethyl chloride, isopropyl chloride, chloroform, sulfuryl chloride, carbon disulfide and the like. Of the alkyl halides, methyl chloride is the preferred solvent, especially in view of the greater ease of separation therefrom of any traces of hydrogen chloride and such like impurities which may be produced by interaction between the aluminum chloride and the alkyl halide or other side reactions. In general the catalyst solvent is one which is characterized by less than three carbon atoms per molecule, a freezing point below −80° C. and non-reactivity with aluminum chloride.

The following examples are offered to illustrate certain features of the invention, and it will be understood that all of the specific conditions and limitations given are not necessarily co-extensive with the broad scope of the invention as defined in the claims.

*Example I*

A six-liter cartridge was packed with 21 lbs. of solid aluminum chloride and immersed in a constant temperature bath (−80° C.) and a stream of methyl chloride chilled to −80° C. was passed through the cartridge. The liquid effluent from the cartridge contained approximately 0.02 to 0.05 gram of aluminum chloride per 100 cc. methyl chloride and was used to catalyze the copolymerization of an 18% feed of 96.5% by weight of isobutylene and 3.5% by weight of isoprene at a temperature of −100° C. 7650 lbs. of 90+ Mooney polymer were produced per lb. of aluminum chloride at a conversion of 68.0 weight percent.

*Example II*

Powdered, solid aluminum chloride was agitated with sufficient methyl chloride at −23° C. to give a solution containing 0.5 gram of aluminum chloride per 100 cc. of methyl chloride. This solution was used to catalyze the copolymerization of an 18% feed of 96.9% isobutylene and 3.1% isoprene. The results showed that only 1200 lbs. of polymer having a Mooney of 60 were formed per lb. of aluminum chloride at a conversion of 65 weight percent.

*Example III*

A catalyst was prepared as in Example I except that the temperature of the methyl chloride and the catalyst was maintained at +38° C. A catalyst concentrate containing approximately 2–3 wt. percent aluminum chloride was obtained. This concentrate was diluted with additional methyl chloride and used to catalyze the copolymerization of about 25–26% feed of about 97% by weight of isobutylene and 3% by wt. of isoprene at a temperature of −100° C. The following results were obtained:

| | | | | |
|---|---|---|---|---|
| Catalyst concentration, grams AlCl₃/100 cc. solution | 0.14 | 0.13 | 0.24 | 0.21 |
| Catalyst efficiency (lb. polymer per lb. AlCl₃) | 1,460 | 1,860 | 1,070 | 1,430 |
| Feed: | | | | |
| Monomer concentration (isobutylene +isoprene) | 25 | 26 | 25 | 26 |
| Weight percent isoprene on isobutylene | 2.8 | 2.6 | 2.9 | 2.9 |
| Mooney viscosity, 8 minutes at 212° F. | 74 | 74 | 45 | 45 |

The above data clearly demonstrate that the catalyst prepared according to the technique of the present invention is eminently superior to the usual batch method for preparing the catalyst. The technique of this invention gives a catalyst which, when used to catalyze the preparation of a copolymer of a major quantity of isobutylene and a minor quantity of isoprene, gives a product yield of about 6.5 times that obtained with a catalyst prepared according to the usual technique, whether batch or continuous.

While the above catalyst has been described in connection with the preparation of butyl rubber by the copolymerization of a major proportion of isobutylene with a minor proportion of isoprene, it may also be used in the copolymerization of other hydrocarbons such as isobutylene or diisobutylene with aromatic hydrocarbons such as benzene, toluene, or styrene, the homopolymerization of isobutylene, the alkylation of isoparaffins and olefins, the isomerization of normal paraffins to isoparaffins, etc.

The nature of the present invention having thus been set forth and specific examples of the same given, what is claimed as new and useful and desired to be secured by Letters Patent is:

1. A process for preparing a catalyst of improved efficiency which comprises passing through a body of solid aluminum chloride at a temperature of about −80° C., an organic solvent previously chilled to about −80° C. and characterized by less than three carbon atoms per molecule, a freezing point below −80° C. and non-reactivity with aluminum chloride.

2. Process according to claim 1 in which the organic solvent is an alkyl halide.

3. Process according to claim 2 in which the alkyl halide is methyl chloride.

4. A process which comprises copolymerizing a major proportion of isobutylene and a minor proportion of a diolefin at a temperature below −50° C., in the presence of a solution of aluminum chloride in an organic solvent previously chilled to about −80° C. and characterized by less than three carbon atoms per molecule, a freezing point below −80° C. and non-reactivity with aluminum chloride, said aluminum chloride solution being prepared by passing the said solvent through a body of the aluminum chloride at a temperature of about −80° C.

5. Process according to claim 4 in which the organic solvent is an alkyl halide.

6. Process according to claim 5 in which the alkyl halide is methyl chloride.

7. A process for preparing a catalyst of improved efficiency which comprises passing through a body of solid aluminum chloride at a temperature of about −80° C., an organic solvent previously chilled to about −80° C. and characterized by less than 3 carbon atoms per molecule, a freezing point below −80° C. and non-reactivity with aluminum chloride and recovering a catalyst solution containing about 0.02–0.05 gram of aluminum chloride per 100 cc. of solvent.

8. A process which comprises copolymerizing a major proportion of isobutylene and a minor proportion of a diolefin at a temperature below −50° C. in the presence of a catalyst solution prepared in accordance with claim 7.

References Cited in the file of this patent

UNITED STATES PATENTS

| | | |
|---|---|---|
| 2,515,138 | Schutze | July 11, 1950 |
| 2,516,683 | Dornte | July 25, 1950 |
| 2,521,432 | Walsh | Sept. 3, 1950 |